United States Patent [19]
Wu et al.

[11] Patent Number: 5,717,133
[45] Date of Patent: Feb. 10, 1998

[54] MIXED SAMPLING RATE PROCESSING FOR MISFIRE DETECTION

[75] Inventors: Zhijian James Wu, Rochester Hills; Anson Lee, St. Clair, both of Mich.

[73] Assignee: Chrysler Corporation, Auburn Hills, Mich.

[21] Appl. No.: 755,046

[22] Filed: Nov. 22, 1996

[51] Int. Cl.$^6$ ..................................................... G01M 15/00
[52] U.S. Cl. ........................... 73/116; 73/117.3; 123/419; 123/436; 364/431.07
[58] Field of Search ..................... 73/116, 117.2, 73/117.3; 123/419, 425, 436; 364/431.07, 431.08

[56] References Cited

U.S. PATENT DOCUMENTS

| | | |
|---|---|---|
| 3,908,366 | 9/1975 | Masaki . |
| 4,179,922 | 12/1979 | Bouverie et al. . |
| 4,186,701 | 2/1980 | Suzuki et al. . |
| 4,271,811 | 6/1981 | Suzuki et al. . |
| 4,308,519 | 12/1981 | Garcea et al. . |
| 4,461,257 | 7/1984 | Hosaka et al. . |
| 4,488,528 | 12/1984 | Morikawa . |
| 4,491,110 | 1/1985 | Bone et al. . |

(List continued on next page.)

OTHER PUBLICATIONS

Estimate of IC Engine Torque from Measurement of Crankshaft Angular Position, Giorgio Rizzoni and Francis T. Connolly, Ohio State University (SAE Paper No. 932410).
An On-Line Engine Roughness Measurement Technique, William P. Mihelc and Stephen J. Citron, School of Mechanical Engineering, Purdue University, West Lafayette, Indiana (SAE Paper No. 840136).

Cylinder by Cylinder Engine Pressure and Pressure Torque Waveform Determination Utilizing Speed Fluctuations, Stephen J. Citron, John E. O'Higgins, and Lillian Y. Chen, Engine Controls Lab, School of Mechanical Engineering, Purdue University, West Lafayette, Indian a (SAE Paper No. 890486).

(List continued on next page.)

*Primary Examiner*—George M. Dombroske
*Attorney, Agent, or Firm*—Mark P. Calcaterra

[57] ABSTRACT

The present invention provides a method of detecting internal combustion engine misfiring. The method includes mixed rate sampling of crankshaft angular velocity for a plurality of cylinder firing events to generate a crankshaft angular velocity signal and a cylinder firing synchronization signal. The apparatus for executing the method comprises a crankshaft in operative relation with the internal combustion engine. A crankshaft sensor wheel is rotatably triggered by the crankshaft and includes a plurality of predetermined sensor indicators disposed at least at two different angular widths. A sensor is positioned adjacent to the wheel for sensing the passage of each indicator in producing a signal pulse having a duration corresponding to the angular width of the sensed indicator in response thereto. A counter determines the time intervals between signal pulses generated by the sensor including a synchronization signal time interval and an RPM signal time interval. The synchronization signal time interval is then utilized to calculate a plurality of crankshaft angular velocities for a plurality of RPM indicators replaced by a synchronization indicator. A misfire detector then determines if a misfire has occurred by interpreting a series of data points developed from the plurality of crankshaft angular velocities.

20 Claims, 7 Drawing Sheets

U.S. PATENT DOCUMENTS

| | | |
|---|---|---|
| 4,532,592 | 7/1985 | Citron et al. |
| 4,562,818 | 1/1986 | Kohama et al. |
| 4,606,224 | 8/1986 | Tedeschi et al. |
| 4,716,874 | 1/1988 | Hilliard et al. |
| 4,782,692 | 11/1988 | Peden et al. |
| 4,846,129 | 7/1989 | Noble. |
| 4,862,093 | 8/1989 | Jiewertz. |
| 4,886,029 | 12/1989 | Lill et al. |
| 4,928,228 | 5/1990 | Fujimoto et al. |
| 4,930,479 | 6/1990 | Osawa et al. |
| 4,930,481 | 6/1990 | Fujimoto et al. |
| 4,932,379 | 6/1990 | Tang et al. |
| 4,936,277 | 6/1990 | Deutsch et al. |
| 4,941,445 | 7/1990 | Deutsch. |
| 4,976,241 | 12/1990 | Ishida et al. |
| 4,987,711 | 1/1991 | Noji et al. |
| 4,987,771 | 1/1991 | Iwata. |
| 5,021,960 | 6/1991 | Manaka et al. |
| 5,041,979 | 8/1991 | Hirka et al. ............ 73/116 |
| 5,044,194 | 9/1991 | James et al. |
| 5,044,195 | 9/1991 | James et al. |
| 5,056,360 | 10/1991 | Dosdall et al. ............ 73/116 |
| 5,095,742 | 3/1992 | James et al. |
| 5,109,695 | 5/1992 | James et al. |
| 5,117,681 | 6/1992 | Dosdall et al. ............ 73/116 |
| 5,144,927 | 9/1992 | Denz. |
| 5,165,271 | 11/1992 | Stepper et al. ............ 73/116 |
| 5,197,325 | 3/1993 | Tamura et al. ............ 73/117.3 |
| 5,200,899 | 4/1993 | Ribbens et al. |
| 5,231,869 | 8/1993 | Klenk et al. |
| 5,239,473 | 8/1993 | Ribbens et al. |
| 5,278,760 | 1/1994 | Ribbens et al. |
| 5,331,848 | 7/1994 | Nakagawa et al. ............ 73/116 |
| 5,361,629 | 11/1994 | McCombie. |
| 5,392,641 | 2/1995 | McCombie. |
| 5,426,587 | 6/1995 | Imai et al. ............ 364/431.07 |
| 5,497,748 | 3/1996 | Ott et al. ............ 73/116 |

OTHER PUBLICATIONS

Advanced Signal Processing for Misfire Detection in Automotive Engines, William B. Ribbens and Steven Bieser, ©1995 IEEE.

Analysis and Processing of Shaft Angular Velocity Signals in Rotating Machinery for Diagnostic Applications, Yong W. Kim, Giorgio Rizzoni, Bahman Samimy, Yue Y. Wang, ©1995 IEEE.

Detection of Partial Misfire in IC Engines Using a Measurment of Crankshaft Angular Velocity, Donghyeon Lee (Hyundai Motor Co.) and Giorgio Rizzoni (The Ohio State Univ.) (SAE Paper No. 951070).

Road Test Results of an I–C Engine Misfire Detection System, W.B. Ribbens and J. Park, University of Michigan (SAE Paper No. 930398).

Road Tests of a Misfire Detection System, W.B. Ribbens and J. Park, University of Michigan (SAE Paper No. 940975).

A New Metric for Torque Nonuniformity, William B. Ribbens (SAE Paper No. 830425).

Applications of Precise Crankshaft Position Measurements for Engine Testing, Control and Diagnosis, W.B. Ribbens and G. Rizzoni (SAE Paper No. 890885).

A Mathematical Model Based Method for Diagnosing Failures in Automotive Electronic Systems, W.B. Ribbens (SAE Paper No. 910069).

Onboard Diagnosis of Engine Misfires, William B. Ribbens and Giorgio Rizzoni (SAE Paper No. 901768).

Estimate of indicated Torque from Crankshaft Speed Fluctuations: A Model for the Dynamics of the IC Engine, Giorgio Rizzoni, IEEE Transactions on Vehicular Technology, vol. 38, No. 3, aug. 1989 (©1990 IEEE).

Crankshaft Position Measurement with Applications to Ignition Timing, Diagnostics and Performance Measurement, Yibing Dong, Giorgio Rizzoni, and William B. Ribbens—©1987 (SAE Paper No. 871914).

Fast Transforms for Rapid Isolation of Misfiring Cylinders, Giorgio Rizzoni ©1987 (SAE Paper No. 871915).

Applications of Precise Crankshaft Position Measurements for Engine Testing, Control, and Diagnosis, W.B. Ribbens and G. Rizzoni (SAE Paper No. 890885).

Torque Nonuniformity Measurements in Gasoline Fueled Passenger Cars Equipped with Automatic Transmission—Theory and Experimental Results, W.B. Ribbens and D. Gross (SAE Paper No. 860414).

A Non–Contacting Torque Sensor for the Internal Combustion Engine, W.B. Ribbens (SAE Paper No. 810155).

Experimental Road Test of a Noncontacting Method of Measuring I–C Engine Torque Nonuniformity, William B. Ribbens, ©1985 (SAE Paper No. 850454).

On–Line Estimation of Indicated Torque in IC Engines Using Nonlinear Observers, Sergey Drakunov, Giorgio Rizzoni, and Yue–Yun Wang, The Ohio State University (SAE Paper No. 950840).

Methods of On–Board Misfire Detection, Günther Plapp, Martin Klenk and Winfried Moser, Robert Bosch GmbH (SAE Paper No. 900232).

Misfire Detection by Evaluating Crankshaft Speed—A Means to Comply with OBDII, Martin Klenk and Winfried (Robert Bosch GmbH) and Werner Mueller and Wolfgang Wimmer (Audi AG) (SAE Paper No. 930399).

Diagnosis of Individual Cylinder Misfires by Signature Analysis of Crankshaft Speed Fluctuations, G. Rizzoni, University of Michigan, ©1989 (SAE Paper No. 890884).

Measurement of Engine Misfire in the Lamborghini 533 V–12 Engine Using Crankshaft Speed Fluctuations, P. Azzoni and G. Cantoni (ENEA), G. Minelli and D. Moro (Universitá di Bologna), Giorgio Rizzoni (The Ohio State Univ.), M. Ceccarani and S. Mazzetti (Lamborghini Automobili) (SAE Paper No. 950837).

The Effect of Engine Misfire on exhaust Emission Levels in Spark Ignition Engines, Ahmed Soliman, Giorgio Rizzoni, and Vasanth Krishnaswami, Ohio State University (SAE Paper No. 950480).

Misfire Detection System for USCAR Low Emission Partnership, W.B. Ribbens, The University of Michigan, Draft for a Final Report.

Direct Estimation of Cyclic Combustion Pressure Variability Using Engine Speed Fluctuations in an Internal Combustion Engine, Francis T. Connolly, Ford Motor Co. (SAE Paper No. 940143).

A Study of Misfire Detection, James LaPalm, Chrysler Corporation.

'x' — MISFIRE
'o' — NORMAL FIRING

Fig-5a
PRIOR ART

'x' -- MISFIRE
'o' -- NORMAL FIRING

MIXED SAMPLING RATE PROCESSING FOR MISFIRE DETECTION

BACKGROUND OF THE INVENTION

1. Technical Field

The present invention relates generally to internal combustion engines and, more particularly, to a method for detecting automobile engine misfire based on mixed data rate sampling of crankshaft rotation.

2. Discussion

Government regulations require automobile manufacturers to control the exhaust of engine combustion byproducts such as hydrocarbons, carbon monoxide, and nitrous oxide. Emission of such byproducts is typically controlled through implementation of a catalytic converter which operates at a high temperature and, through the use of a catalyst, burns the aforementioned unwanted exhaust byproducts to reduce automobile emissions. By implementing catalytic converters into the exhaust systems of an automobile, automobile manufacturers are able to comply with government regulations in a cost-effective manner.

However, if an automobile engine misfires, an increased amount of unburned combustion byproducts is passed through the catalytic converter. Engine misfire occurs as a result of the absence of spark in a cylinder, poor fuel metering, poor compression, or other similar conditions. Over time, regular engine misfire can lead to damage of the catalyst in the catalytic converter and, consequently, increased amounts of unburned byproducts being emitted into the atmosphere.

As a result, regulatory agencies such as the California Air Resources Board (CARB) require that many motor vehicles with feedback fuel control systems be equipped with an emission malfunction indicator that identifies a misfiring engine and the particular malfunctioning component or components. Thus, upon the malfunction indicator being activated, the vehicle operator could proceed to a qualified vehicle repair center to have the malfunctioning component repaired or replaced before an excessive amount of exhaust byproducts is emitted into the air by the vehicle.

Typically, the above mentioned malfunction indicators generate data allowing identification of specific misfiring engine cylinders. In particular, the CARB rules, known as On-Board Diagnostics II guidelines, mandate that the automobile manufacturer specify a percentage of misfires out of the total number of firing events necessary for determining malfunction for: (1) the percent misfire evaluated in a fixed number of revolution increments for each engine speed and load condition which would result in catalyst damage; (2) the percent misfire evaluated in a certain number of revolution increments which would cause a motor vehicle to fail a federal test procedure by more than 1.5 times the CARB standard if the degree of misfire were present from the beginning of the test; and (3) the, degree of misfire evaluated in a certain number of revolution increments which would cause a motor vehicle to fail inspection and a maintenance program tailpipe exhaust emission test. It is contemplated that similar rules are or may be implemented by other states and by the federal government in the foreseeable future.

Government regulations such as those mandated by CARB also require that automobile manufacturers be able to provide information identifying misfiring engine cylinders. This misfire information is typically collected and stored in a computer memory associated with the automobile engine and later downloaded at a service center and is used in diagnostic testing of the vehicle. One misfire detection and identification approach is disclosed in U.S. Pat. No. 5,361,629, issued Nov. 8, 1994 entitled "Single Sensor Misfire Detection Apparatus and Method for an Internal Combustion Engine" which is incorporated herein by reference. The misfire detection approach disclosed in the aforementioned patent senses crankshaft rotation and calculates a crankshaft velocity based on the sensed rotation. The calculated crankshaft velocity changes or a compensated velocity change is compared to a predetermined crankshaft velocity range to determine engine misfire.

Additional engine misfire detection approaches are disclosed in pending U.S. patent application Ser. No. 08/468,117 filed Jun. 6, 1995 for "Engine Misfire Detection with Compensation for Normal Acceleration of Crankshaft", now U.S. Pat. No. 5,574,217; U.S. patent application Ser. No. 08/469,040 filed Jun. 6, 1995 for "Engine Misfire Detection with Rough Road Inhibit", now U.S. Pat. No. 5,544,521; and U.S. patent application Ser. No. 08/468,113 filed Jun. 6, 1995 for "Engine Misfire Detection with Cascade Filter Configuration", now U.S. Pat. No. 5,602,331. The aforementioned applications are assigned to the assignee of the present application and are incorporated herein by reference. The approaches disclosed in the above mentioned patent applications relate to engine misfire detection including sorting of a plurality of changes in crankshaft angular velocity over a predetermined series of cylinder firings and averaging the two middle most angular velocity changes to provide an average change in velocity value. The deviation is determined between the change in angular velocity for a selected cylinder and the avenge change in velocity value. Misfires are detected as a function of a comparison of the deviation with a predetermined threshold velocity value.

Generally, the above-described approaches utilize a crankshaft sensor wheel to measure the speed of the crankshaft and crankshaft speed fluctuations. The crankshaft sensor wheel is welded or otherwise operatively connected to the crankshaft so that the wheel and crankshaft rotate in phase. The wheel includes a plurality of teeth defining slots therebetween projecting from its circumference. As the wheel rotates with the crankshaft, a sensor measures time between subsequent tooth edges. The sensor subsequently generates an analog signal corresponding to the time between edges which takes the shape of an electrical signal comprising a plurality of pulses corresponding to the teeth edges. A counter is then employed to measure the elapsed time between pulse edges on the electrical signal and the speed or rpm is calculated from the counter measurements.

In addition to the signal corresponding to engine speed, automobile manufacturers typically generate a cylinder synchronization signal from measured crankshaft rotation for engine control and diagnostics such as the spark timing control within the engine cylinders, and cylinder identification. The synchronization signal is typically obtained from the same multi-teeth crankshaft sensor wheel and sensor as utilized for measuring crankshaft speed. This reduces the cost of installing, maintaining and operating a separate synchronization wheel and sensor. However, in order for the same wheel and sensor to be implemented for both processes, the target pattern on the multi-teeth crankshaft sensor wheel must be modified.

A crankshaft sensor wheel utilized solely for measuring crankshaft speed includes target teeth evenly distributed about the wheel circumference. The rpm data points are evenly sampled as the evenly spaced teeth edges pass the sensor. A crankshaft sensor wheel employed for generating both crankshaft speed and cylinder spark synchronization signals often has teeth evenly distributed about a predetermined portion of the wheel circumference, followed by an enlarged tooth. The synchronization wheel then has additional teeth distributed about a second predetermined portion of the wheel circumference, followed by an enlarged space. The enlarged tooth and space represent synchronization points for controlling the fuel injection and the spark timing of each cylinder. Depending on the synchronization requirements, two or three evenly distributed teeth are commonly replaced by an enlarged tooth or space every 180 or 360 degrees.

The sensor measures the time between subsequent tooth edges as the crankshaft rotates. During short time intervals the RPM changes relatively little. Thus, the time period between subsequent tooth edges is generally constant or within a known tolerance even under extreme acceleration or deceleration states. However, the time between tooth edges increases substantially as the enlarged tooth or space passes the sensor. The elongated time period is interpreted by the engine controller as indicative of a cylinder firing synchronization point.

In the absence of teeth evenly distributed about the entire circumference of the wheel, the pulse string generated by the sensor includes sections of "missing" pulses where an extended pulse or prolonged absence of pulses corresponding to the synchronization areas occur. The missing pulses cannot be tabulated by the counter and therefore result in missing data points required for calculating rpm or speed. This calculation requires substantially evenly distributed data points from the pulse string.

The missing data points are often approximated by using conventional interpolation and prediction methods. For instance, the zero order holding method assumes that the missing data points are equal to the last known data point value. The first order interpolation method interpolates the missing data points by linearly interconnecting the last previously known data point prior to the missing data points and the first subsequently known data point after the missing data points. Higher order interpolation methods use additional known data points on either side of the missing data points to interpolate the missing data. Furthermore, highly complex methods are available such as the function approximation method and the adaptive prediction method.

While the aforementioned approximation methods are generally acceptable for applications using the mean value of crankshaft speed or rpm, they are not acceptable for misfire applications. Misfire detection systems are very sensitive to the errors commonly caused by such approximation methods since they are based on rpm signal fluctuations. This is particularly true when engine speeds exceed 4,000 rpm where approximation methods severely distort the magnitude and the phase of the signal.

In misfire detection systems, it is easy for a signal with a large separation between misfire signatures and normal firing signatures to achieve good detection performance. However, if the misfire and normal firing signatures are very close or are mixed together in value, the detection performance decreases. Prior art methods of supplying missing data points induce severe distortion of the signal in magnitude and, especially in phase. This greatly degrades the separation performance of the misfire signature and normal firing signature and finally results in degradation of the misfire detection performance. Accordingly, there is a need for an engine misfire detection system that is capable of producing more accurate engine misfire calculations and higher separation of misfire and normal firing signatures.

There is also a need in the art for a misfire detection system that identifies engine misfires through mixed rate sampling of crankshaft sensor wheel rotation, without severely distorting the signal magnitude and phase that often occurs using interpolation methods, such as in the zero holding method and first or higher order interpolation methods, or using function approximation methods and adaptive prediction methods. Moreover, there is a need for an engine misfire detection system in which misfire signatures are clearly separated from normal firing signatures within the signal to provide a clear threshold value for delineating misfire occurrences from normal firing occurrences.

SUMMARY OF THE INVENTION

According to the present invention, a method of detecting internal combustion engine misfiring is provided. The method includes mixed rate sampling of crankshaft angular velocity for a plurality of cylinder firing events to generate a crankshaft angular velocity signal and a cylinder firing synchronization signal. The apparatus for executing the method comprises a crankshaft in operative relation with the internal combustion engine. A crankshaft sensor wheel is rotatably triggered by the crankshaft and includes a plurality of predetermined sensor indicators disposed at least at two different angular widths. A sensor is positioned adjacent to the wheel for sensing the passage of each indicator and producing a signal pulse having a duration corresponding to the angular width of the sensed indicator in response thereto. A counter determines the time intervals between signal pulses generated by the sensor including a synchronization signal time interval and an RPM signal time interval. The synchronization signal time interval is then utilized to calculate a plurality of crankshaft angular velocities for a plurality of RPM indicators replaced by a synchronization indicator. A misfire detector then determines if a misfire has occurred by interpreting a series of data points developed from the plurality of crankshaft angular velocities.

DETAILED DESCRIPTION OF THE DRAWINGS

DETAILED DESCRIPTION OF THE PREFERRED EMBODIMENT

Figure 1:
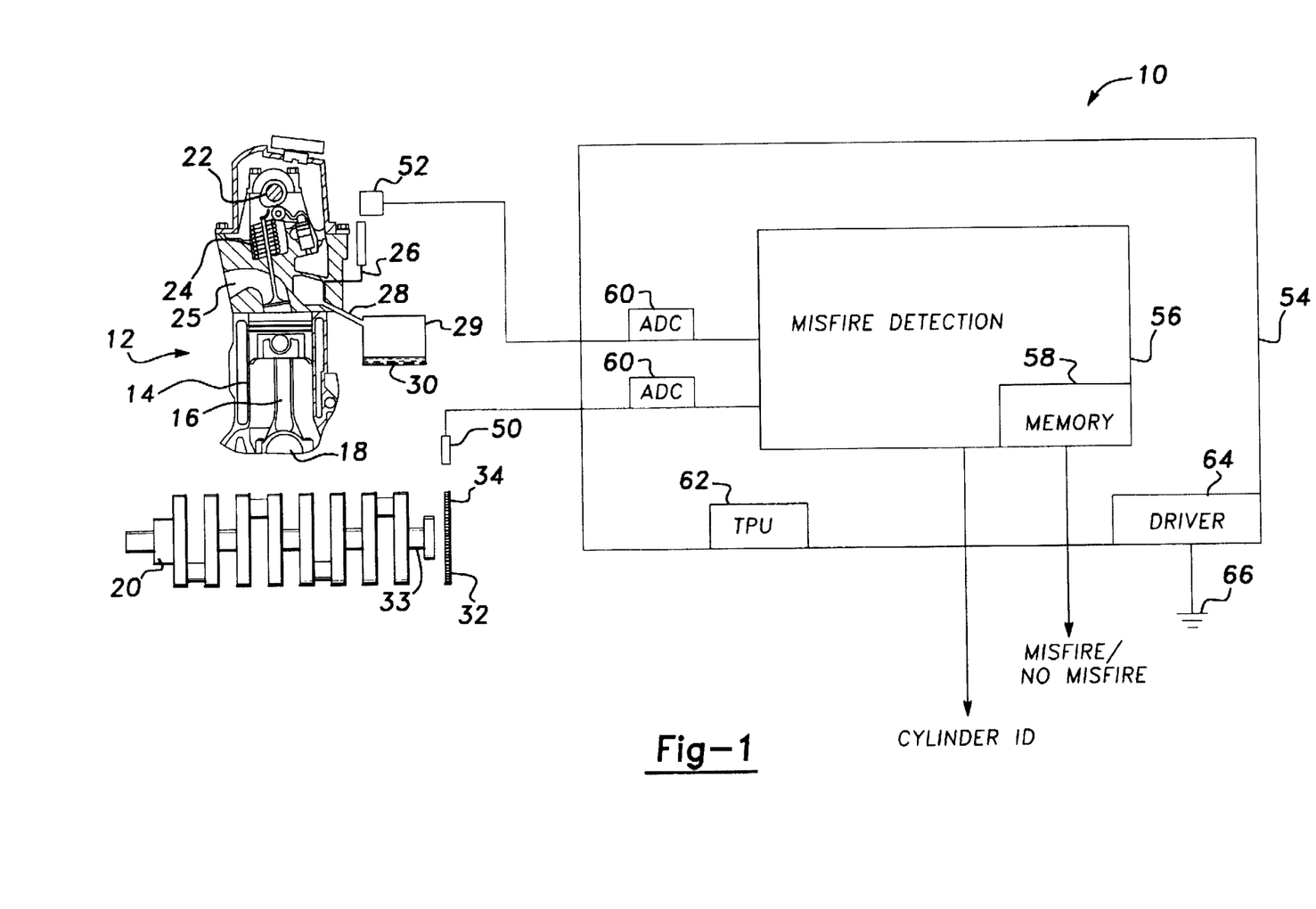
FIG. 1 illustrates a side elevational view of a spark-ignited internal combustion motor vehicle engine in cross-section, a crankshaft associated with the engine, and a block diagram of a motor vehicle electronic control unit in which the spark advance control of the present invention is implemented.

Referring now to the drawing figures, a block diagram of the engine system, in which the misfire detection system of the present invention is implemented, is shown generally at 10. The system 10 includes an internal combustion spark ignited engine 12, shown in partial cross-section, which is of the type implemented in a conventional motor vehicle (not shown). The engine contains a plurality of cylinders, represented by the cylinder 14, with each of the cylinders having a piston, represented by the piston 16, operatively disposed therein. Each of the pistons is connected by a connecting rod 18 to a crankshaft 20. A conventional engine cam shaft 22 is also operatively located within the engine 12 for opening and closing an intake valve or valves, such as the valve 24, associated with the cylinder 14 for supplying a fuel/air mixture to the cylinders in a manner well known in the art during the piston intake. A manifold 25 is also operatively associated with the intake valve 24 for supplying air from outside of the engine into the cylinder 14 to provide air for the valve fuel/air mixture supplied to the cylinder.

As an example, the engine 12 is a conventional four-cylinder, four-stroke engine having an intake stroke in which fuel and air mixture is input into the cylinder 14 through the intake valve 24, a compression stroke in which the fuel/air mixture is compressed by the piston 16, an expansion stroke in which a spark supplied by a spark plug 26 ignites the fuel/air mixture, and an exhaust stroke during which gases from the burned fuel are exhausted from the cylinder through an exhaust system 28, including a catalytic converter 29 having an associated catalyst 30. Although the preferred embodiment of the present invention is implemented in a four cylinder, four-stroke engine such as that shown at 12, it should be appreciated that the present invention may be implemented in any conventional engine system, including a two-stroke engine system, or any spark ignited or diesel engine system.

Figure 2:
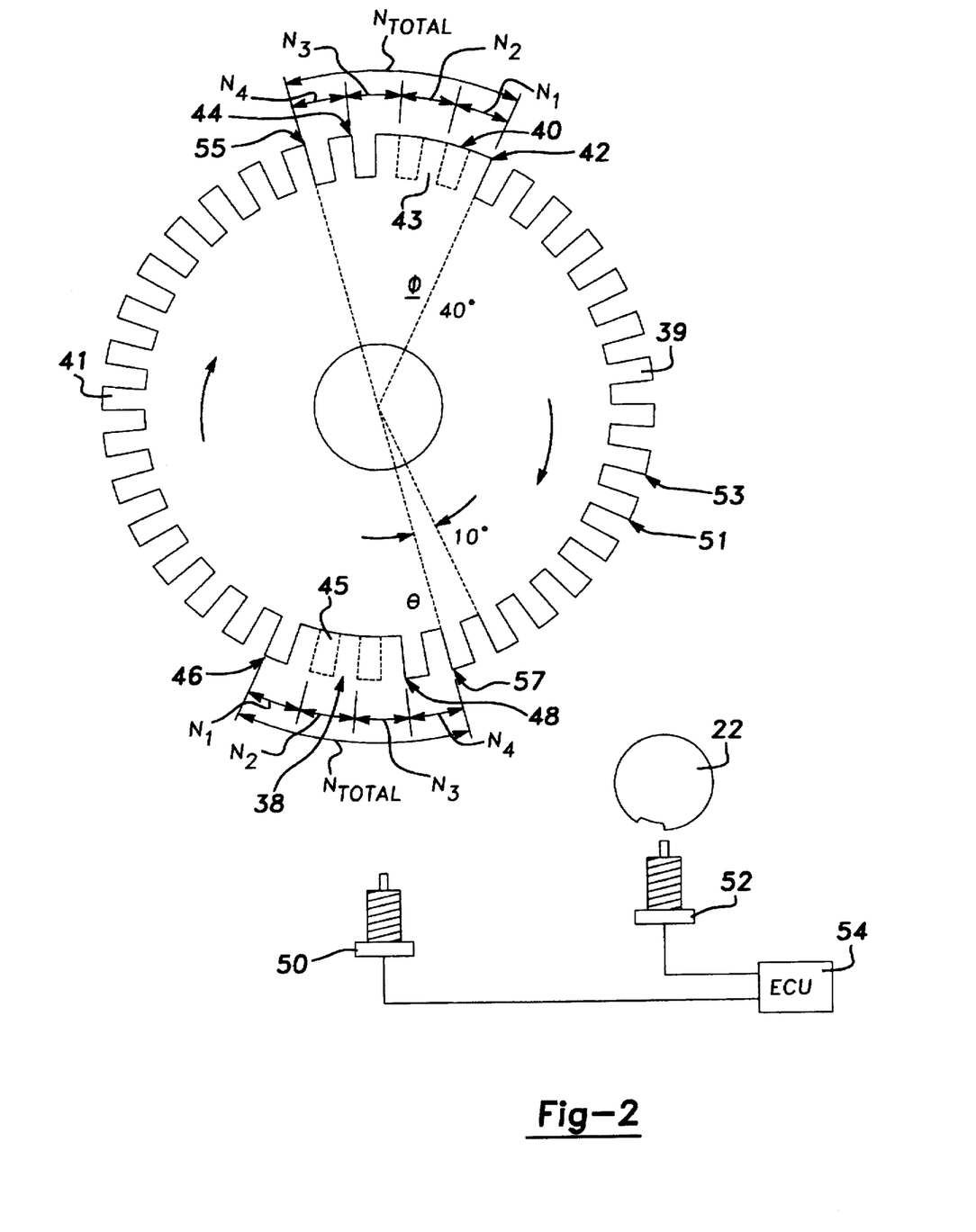
FIG. 2 is an enlarged from view of an example of a crankshaft sensor wheel and crankshaft sensor shown in FIG. 1.

Still referring to FIG. 1, a crankshaft sensor wheel 32 is operatively fastened to a sensor wheel mount nose 33 by screws or other similar fastening devices. The sensor wheel mount nose 33 is in turn welded or otherwise operatively connected to the crankshaft 20 by spot welding or any other similar technique. As best seen in FIG. 2, the crankshaft sensor wheel 32 includes a plurality of teeth 34 defining slots 36 therebetween. The slots 36 operate as crankshaft angular velocity sensing points for measuring the angular velocity of the crankshaft, and thus the engine speed. The crankshaft sensor wheel 32 also includes synchronization areas defined by a wide slot 38 and a wide tooth 40. Preferably in a 10° crankshaft sensor wheel, a plurality of 10° teeth 39 extend from the circumference of the wheel 32 for about 150°. Next, the 30° slot 38 is formed along the circumference. A second plurality of 10° teeth 41 then extend for a second 150° along the circumference. The 30° tooth 40 is then formed 180° opposite the slot 38. (Note that a 10° tooth means that the teeth width plus its corresponding slot width is equal to 10°. Similarly, the wide tooth and wide slot are called out in the same manner for easy reference.)

The system 10 also includes a crankshaft sensor 50 in communication with the sensor wheel 32, and a cam position sensor 52 in communication with the cam shaft 22. Both the crankshaft sensor 50 and the cam shaft sensor 52 generate signals used by the misfire detection system of the present invention in a manner discussed in detail below. The crankshaft sensor 50 measures time elapsed between rotation of tooth edges 42, 44 and subsequent slot edges 46, 48 and other corresponding pairs of 10° slot edges such as 51, 53 past the crankshaft sensor 50. The crankshaft sensor also measures time elapsed ($\Delta T_{total}$) between rotation of tooth edges 42, 55 and slot edges 46, 57. The crankshaft sensor 50 subsequently generates an analog signal corresponding to this rotation time period that is utilized in determining crankshaft angular velocity, and thus misfiring occurrences, as will be described in detail below.

The cam shaft sensor 52 is utilized together with the crankshaft sensor 50 for identification of specific cylinder firing events and is implemented based on the fact that the cam shaft 22 rotates 360° for every 720° of rotation of the crankshaft 20. Cylinder firing event identification enables the misfire detection system of the present invention to calculate which cylinder or cylinders are misfiring. The engine system 10 preferably uses a stock cam sensor 52 and associated cylinder identification technique to determine the top dead center position of the number 1 cylinder. However, other cylinder identification techniques may be implemented according to the specific engine system.

Additional engine system components and sensors are not shown, as such components and sensors are conventionally implemented and are well known to those skilled in the art. It should be appreciated at this point that the crankshaft sensor 50 and the cam shaft sensor 52 may be Hall effect sensors, optical sensors, variable reluctance sensors, or any other type of sensors well known in the art. Each of the sensors 50, and 52 generate an analog signal representative of the sensed condition and communicates this analog signal to an electronic control unit (ECU) 54 which is implemented along with other control circuitry (not shown) within the motor vehicle.

Referring again to FIG. 1, the ECU 54 includes a microcontroller 56 having an associated memory 58 and analog to digital converters 60 for converting analog signals from the sensors 50, 52 to digital signals. The memory 58 is a memory of the type well known in the art, such as random access memory (RAM), read-only memory (ROM), or any other similar type of conventional computer memory. A time processor unit 62 may also be used at the ECU 54. The unit 62 processes outputs from the analog to digital converters 60 to condition the signals from the sensors 50, 52 for use in the misfire detection system of the present invention. The ECU 54 also includes a lamp driver 64 which, upon the appropriate output signal being generated by the micro-controller 56, drives an output display 66 such as a driver warning light. The electronic control unit 54 further includes additional timers, counters and like components of the type typically associated with a conventional microcontroller and which are used to implement the present invention.

It should be appreciated that the engine cylinders 14 are oriented in a conventional straight-line configuration. As a result, each cylinder has a 180° expansion stroke with a cylinder firing order of 1-3-4-2. As illustrated in FIG. 2, angular velocity measurements for the crankshaft 20 are measured by determining the time period for crankshaft angular displacement θ for preferably a 10° expansion stroke interval for each of the four cylinders before the piston reaches top dead center (TDC) at the end of the expansion stroke. By measuring the time period for each 10° angular displacement of the crankshaft, a high data rate (HDR) sampling of the crankshaft is achieved. Angular velocity measurements for the crankshaft 20 are also measured by determining the time period for crankshaft angular displacement φ for preferably a 40° expansion stroke interval for each of the four cylinders after the piston reaches TDC at the start of the expansion stroke. By also measuring the time period for two 40° angular displacements of the crankshaft per revolution, a mixed data rate sampling of the crankshaft is achieved.

The 30° tooth 40 is formed in the crankshaft sensor wheel 32 at a position corresponding to a piston position of top dead center (TDC) in the piston expansion stroke for cylinders 1 and 4. As can be seen, the 30° tooth essentially comprises the position where three 10° teeth 43 (shown in phantom) could be disposed if the crankshaft wheel was only to be utilized for RPM measurements. Likewise, the 30° slot 38 is formed in the crankshaft sensor wheel at a position corresponding to a piston location of TDC for cylinders 3 and 2. The slot 38 is located 180 degrees opposite the tooth 40 and is formed at a position where two 10° teeth 45 (shown in phantom) could be disposed for exclusive rpm measurement applications. The slot 38 and the tooth 40 operate as cylinder firing synchronization sensing points for timing a cylinder firing sequence.

As can be seen first and second edges 42 and 44 are associated with the tooth 40. The first edge 42 corresponds to the initiation of the cylinder synchronization signal for cylinder numbers 1 and 4 in the four cylinder engine arrangement, while the second edge 44 corresponds to the termination of this signal. Also, third and fourth edges 46, 48 are associated with the slot 38. The third edge 46 corresponds to the initiation of the cylinder synchronization signal for cylinder numbers 3 and 2 in the four cylinder engine arrangement, while the fourth edge 48 corresponds to the termination of this signal.

Figure 3:
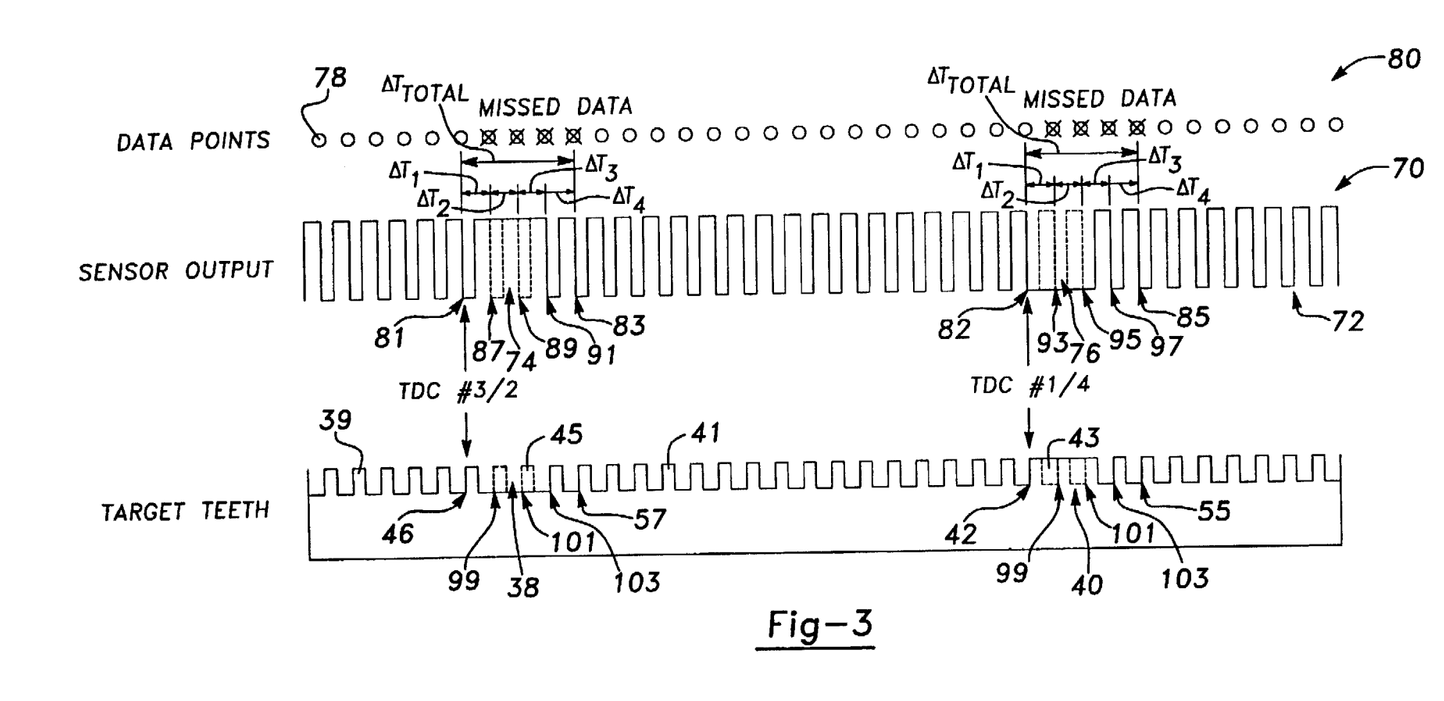
FIG. 3 illustrates the crankshaft sensor wheel target teeth, the corresponding crankshaft sensor output signal, and the corresponding data points generated from the crankshaft sensor's output signal.

Referring now to FIG. 3, the crankshaft sensor wheel target teeth are shown in a linear form. As can be seen, the 30° slot 38 is located at a position corresponding to TDC for cylinder numbers 3 and 2. Additionally, the 30° tooth 40 is located at a position corresponding to TDC for cylinder numbers 1 and 4. The 10° teeth 43, 45 which have been replaced by the slot 38 and the tooth 40 are shown in phantom.

Also shown in FIG. 3 is an output signal 70 from the crankshaft sensor which includes a plurality of pulses 72 corresponding to the target teeth of the crankshaft sensor wheel 32. As can be seen, each rising edge of a target tooth 39, 41 is represented in the output signal 70 by a falling edge of a pulse 72. The output signal 70 also includes an elongated pulse 74 representing the detection of the 30° slot 38 on the crankshaft sensor wheel 32 by the sensor 50. Furthermore, the output signal 70 includes a prolonged absence of pulses or space 76 representing the detection of the 30° tooth 40 by the sensor 50.

A data point, as represented by the data point 78, is generated by the micro controller 56 for each pulse falling edge along the output signal 70. The data string 80 is interrupted due to the series of data points missing corresponding to the elongated pulse 74 and space 76. Three data points are missing from the data string 80 corresponding to the missing teeth and corresponding missing pulses. One additional data point is missing from the data string 80 due to the incompatibility of the crankshaft speed sensor 50 with the uneven spacing between teeth. Therefore, although a data point is generated for the falling edge of the first full pulse subsequent to the pulse 40 or the space 38, it is deemed unreliable for misfire detection and must be estimated. For this reason, the sensor 50 is configured to measure the time $\Delta T_{total}$ which extends to the next reliable pulse edge.

According to the invention, the crankshaft angular velocity (N) is assumed to be constant over the synchronization areas where the data points are missing. The angular displacement of the crankshaft sensor wheel 32 over the 40° interval is measured by the sensor between the rising edge 42, 46 and the rising edge 55, 57. The sensor generates a corresponding output signal which includes the elongated pulse 74 and space 76. A counter (not shown) measures a time $\Delta T_{total}$ for the angular displacement φ which comprises the distance along the signal between the falling edges 81, 82 and the falling edges 83, 85. The time $\Delta T_{total}$ consists of the incremental time periods $\Delta T_1$, $\Delta T_2$, $\Delta T_3$, and $\Delta T_4$ which cannot be measured by the counter due to the absence of rising tooth edges and corresponding falling pulse edges. $\Delta T_1$ represents the time between the falling edge 81 and the estimated falling edge 87 ($\Delta T_1$ also represents the time between the falling 82 and the estimated falling edge 93); $\Delta T_2$ represents the time between the estimated falling edge 87 and the estimated falling edge 89 (or between the estimated falling edge 93 and estimated falling edge 95). $\Delta T_3$ represents the time between the estimated falling edge 89 and the falling edge 91 (or between the falling edge 95 and falling edge 97). $\Delta T_4$ represents the time between the falling edge 91 and the falling edge 83 (or between the falling edge 97 and the falling edge 85). It should be appreciated that the time $\Delta T_{total}$ is equal to the sum of the times $\Delta T_1$, $\Delta T_2$, $\Delta T_3$, and $\Delta T_4$ or: $\Delta T_{total} = \Delta T_1 + \Delta T_2 + \Delta T_3 + \Delta T_4$.

Crankshaft angular velocity or rpm N for any given crankshaft sensor wheel angular displacement is proportional to the reciprocal of the time interval, $N \propto 1/\Delta T$ where $\Delta T$ is equal to the time between subsequent points defining the displacement region. The angular velocity $N_{total}$ of the crankshaft 22 over either 40° crankshaft sensor wheel synchronization area is proportional to the time $1/\Delta T_{total}$. Similarly, the rpm $N_1$ of the crankshaft 22 over a portion of the crankshaft sensor wheel 32 between the tooth edge 46 (or 42) and the tooth edge 99 is proportional to a time $1/\Delta T_1$. Likewise, the incremental crankshaft angular velocities $N_2$, $N_3$, and $N_4$ over the subsequent portions of the crankshaft sensor wheel 32 between the tooth edges, 99 to 101; 101 to 103; and 103 to 57 (or 55) are proportional to the times $1/\Delta T_2$, $1/\Delta T_3$, and $1/\Delta T_4$ respectively.

Assuming that the angular velocity of the crankshaft sensor wheel 32 is constant over the crankshaft sensor wheel synchronization areas, i.e., $N_1 = N_2 = N_3 = N_4$, the incremental time intervals $\Delta T_1$, $\Delta T_2$, $\Delta T_3$, and $\Delta T_4$ are also equal: $\Delta T_1 = \Delta T_2 = \Delta T_3 = \Delta T_4$. Furthermore, since $\Delta T_{total} = \Delta T_1 + \Delta T_2 + \Delta T_3 + \Delta T_4$, and $\Delta T_1 = \Delta T_2 = \Delta T_3 = \Delta T_4$, it follows that $\Delta T_{total} = 4\Delta T_1$ and therefore $\Delta T_1 = \Delta T_{total}/4$. Also, since $N_1 \propto 1/\Delta T_1$ it follows that $N_1 \propto 1/(\Delta T_{total}/4)$ or $N_1 \propto 4/\Delta T_{total}$. Likewise, the rpm for each missing data point $N_1$, $N_2$, $N_3$, and $N_4$ is proportional to and can be estimated by $4/\Delta T_{total}$.

The steps are as follows:

1) It is known that:

$$\Delta T_{total} = \Delta T_1 + \Delta T_2 + \Delta T_3 + \Delta T_4$$

2) Assume that:

$$\Delta T_1 = \Delta T_2 = \Delta T_3 = \Delta T_4$$

3) then:

$$\Delta T_{total} = 4\Delta T_1$$

4) or:

$$\Delta T_1 = \Delta T_{total}/4$$

5) It is also known that:

$$N_x \propto 1/\Delta T_x$$

6) Accordingly:

$$N_1 \propto 1/(\Delta T_{total}/4)$$

7) Or:

$$N_1 \propto 4/\Delta T_{total}$$

Figure 4A:
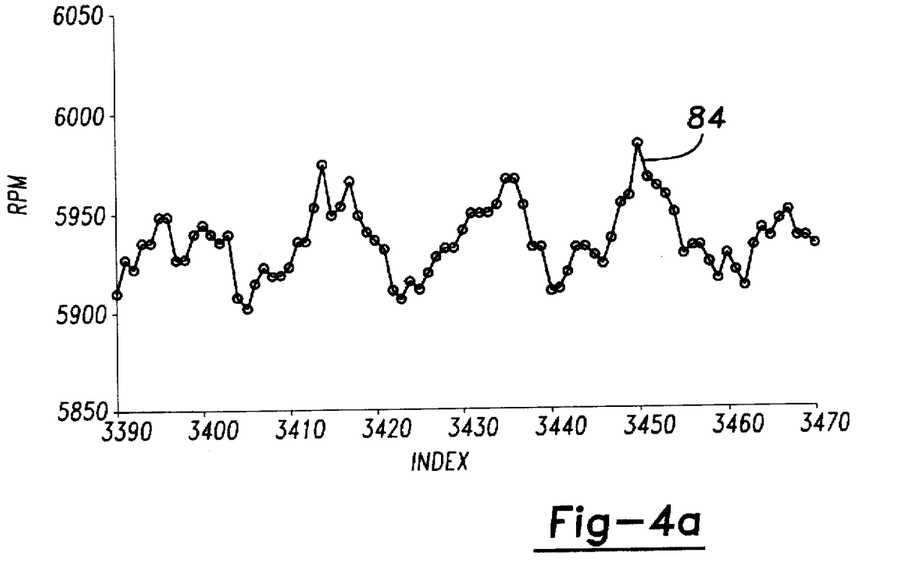
FIG. 4a graphically illustrates a sensed engine speed signal with no missing data points generated over a number of crankshaft angular velocity samples at a given engine speed and MAP from a crankshaft sensor wheel having equally spaced target teeth.
Figure 4B:
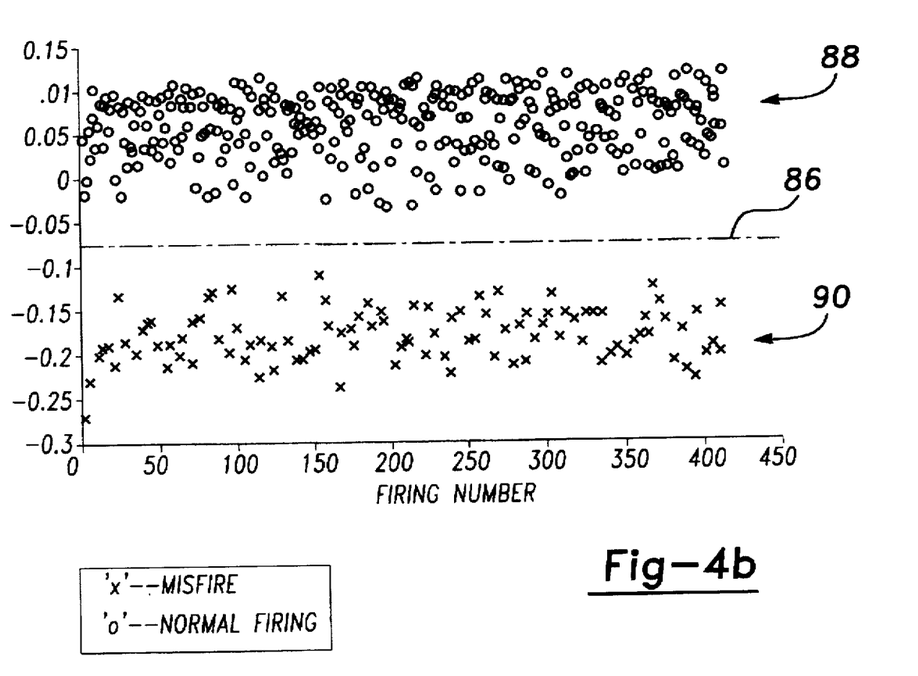
FIG. 4b represents a separation diagram of the processed engine speed signal of FIG. 4a using a signal processing technique, which illustrates the clear separation of normal firing signatures from misfire signatures within the sensed and processed engine speed signal when no data points are missing.

Turning now to FIGS. 4a and 4b, an engine speed signal 84 is shown as an example for the four cylinder, four-stroke, two cycle engine 12, at a speed of 6000 rpm and MAP pressure of 200 Torr for a plurality of 10° samples taken over numerous cylinder firing events. In FIG. 4a, the engine speed signal 84 is shown for a crankshaft sensor wheel having teeth evenly distributed every 10° about the entire circumference, i.e., no teeth have been removed. As can be seen, there are no data points missing from the graph since no teeth were removed from the crankshaft sensor wheel and therefore a pulse and data point were generated every 10°.

In FIG. 4b, each data point generated from the signal has been further processed by a microcomputer using a digital signal processing technique. As shown, when all data points are available, normal signatures are clearly separated from misfire signatures after processing. Accordingly, a constant or time-varying threshold value 86 can be established to delineate normal firing signatures 88 from misfire signatures 90. A subsequent determination of misfire occurrences can be made by comparing the signature of a data point to the threshold value. If the signature falls on a first side of the threshold value 86, it represents a normal firing occurrence. If the signature falls on the other side of the threshold value, it represents a misfire occurrence.

Figure 5A:
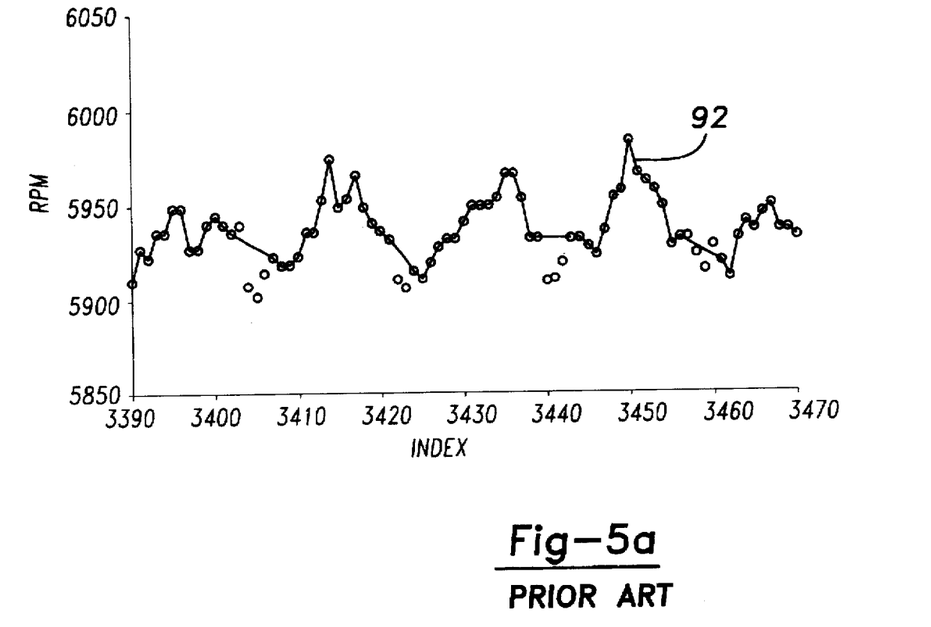
FIG. 5a graphically illustrates a sensed engine speed signal generated from a crankshaft sensor wheel having selected target teeth removed, the signal includes missing data points which have been interpolated according to a first order interpolation prior art method.
Figure 5B:
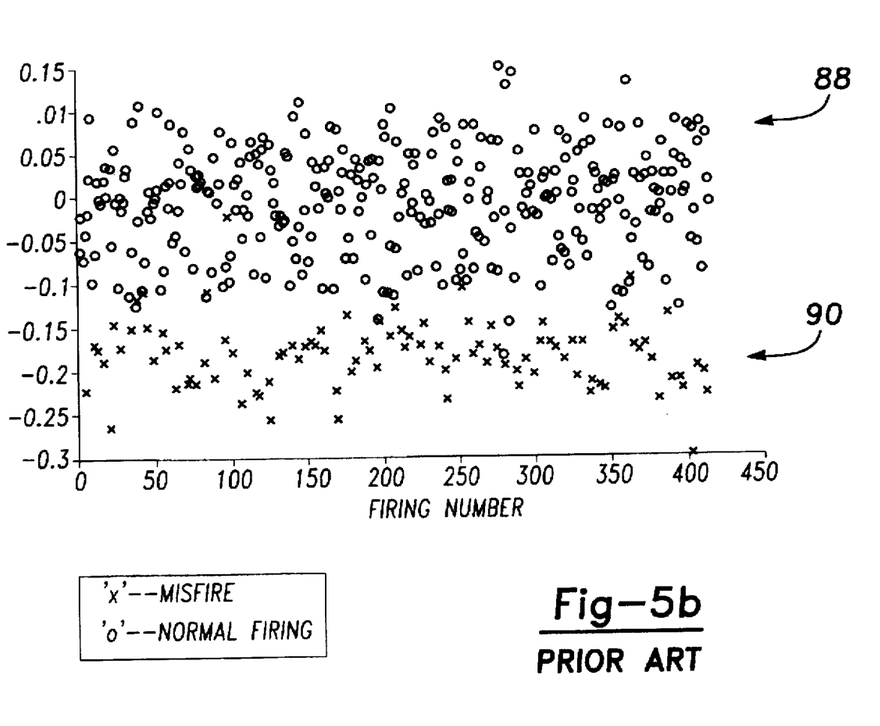
FIG. 5b represents a separation diagram of the processed engine speed signal of FIG. 5a using the same signal processing technique as in FIG. 4b, which illustrates the inability of a prior art method to separate normal firing signatures from misfire signatures within the sensed and processed engine speed signal when data points are missing.

Similarly, FIGS. 5a and 5b show an engine speed signal 92 for the engine 12 at a speed of 6000 rpm and at a MAP pressure of 200 Torr over a plurality of 10° and 40° samples for numerous cylinder firing events. In FIG. 5a, the engine speed signal 92 is shown for a crankshaft sensor wheel 32 having selected 10° teeth replaced by synchronization areas along the circumference at locations corresponding to TDC of the cylinder expansion stroke. In FIG. 5a, the missing data points were interpolated using a prior art method known as first order interpolation. According to this method the last known data point prior to the missing data points and the first known data point subsequent to the missing data points are used to linearly interpolate the missing data.

As can be seen in FIG. 5b, this method does not reliably separate normal firing signatures 88 from misfire signatures 90 within the signal. Accordingly, no threshold value can be well established to delineate a misfire occurrence from a normal firing occurrence. This is generally due to phase distortion of the output signal from the crankshaft speed sensor 50. The phase distortion shifts the signal 92 and skews the subsequent data point interpretation.

Figure 6A:
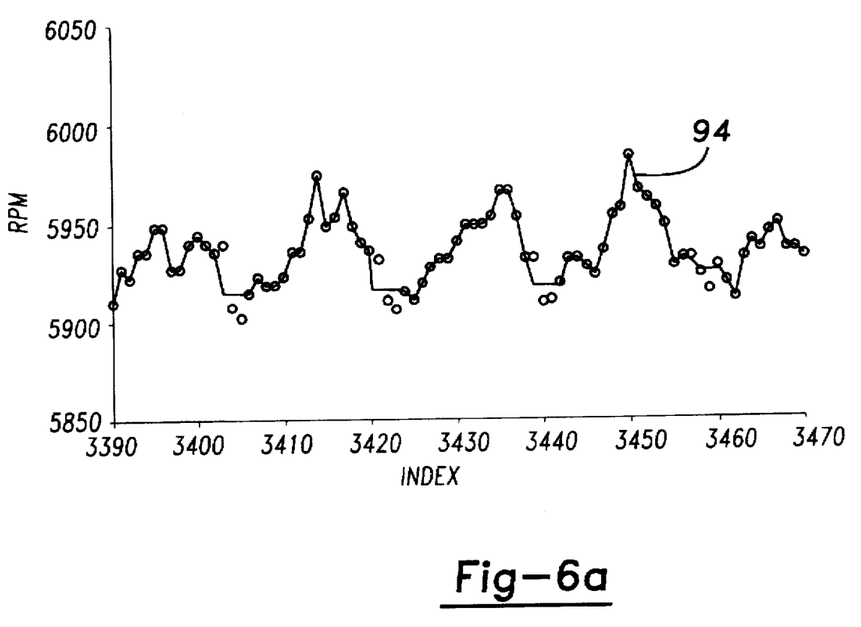
FIG. 6a graphically illustrates a sensed engine speed signal generated from a crankshaft sensor wheel having selected target teeth removed, the signal includes missing data points which have been estimated according to the present invention.
Figure 6B:
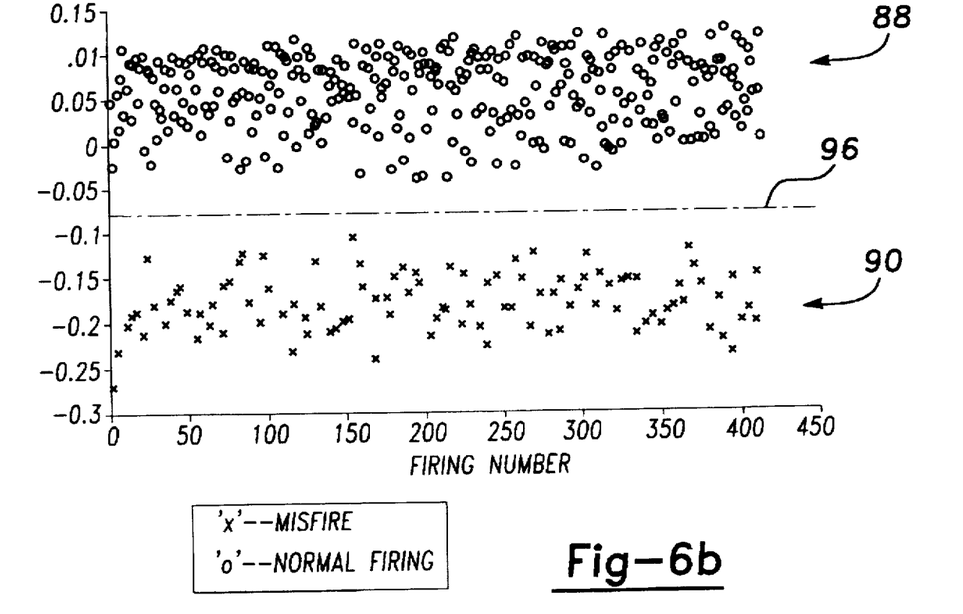
FIG. 6b represents a separation diagram of the processed engine speed signal of FIG. 6a using the same signal processing technique as in FIG. 4b, which illustrates the ability of the present invention to clearly separate normal firing signatures from misfire signatures within the sensed engine speed signal when data points are missing.

Referring now to FIGS. 6a and 6b, an engine speed signal 94 for the engine 12 at a speed of 6000 rpm and at a MAP pressure of 200 Torr over a plurality of 10° and 40° samples for numerous cylinder firing events is shown. The engine speed signal 94 was generated from a crankshaft sensor wheel 32 having selected teeth replaced by synchronization indicators along the circumference at synchronization sensing points. Four data points are missing from the signal 94 every 180° of rotation of the crankshaft sensor wheel 32 corresponding to the uneven spacing caused by the missing 10° teeth. In FIG. 6a, the missing data points were estimated according to the present mixed sampling rate system.

As can be seen in FIG. 6b, the present invention clearly separates normal firing signatures 88 from misfire signatures 90 within the signal. Accordingly, a constant or time-varying threshold value 96 can be determined to delineate normal firing signatures from misfire signatures. A subsequent determination as to misfire occurrences can be made by comparing the signature of a data point to the threshold value 96. When the signature falls on a first side of the threshold value 96, it represents a normal firing occurrence. When the signature falls on the other side of the threshold value 96, it represents a misfire occurrence.

In operation engine speed, which is measured as crankshaft angular velocity by the crankshaft sensor 50, subsequent to being conditioned through the analog to digital converters 60 and the time processor unit 52, is input into the micro-controller 56 which is configured to implement the present invention.

Upon detection of an engine misfire or misfires, the controller 54 generates a misfire signal along with a cylinder identification signal based on information from the camshaft sensor 52. The engine misfire and cylinder identification information is stored in the memory 58 and may be retrieved and utilized for engine diagnostic purposes. Additionally, the engine misfire data may be utilized by the micro-controller 56 to determine whether a given rate of misfire will cause premature failure of the catalyst 30. If the micro-controller 56 determines that the catalyst 30 has failed or will fail, enables the lamp driver 64 to illuminate the driver warning lamp 66.

Figure 7:
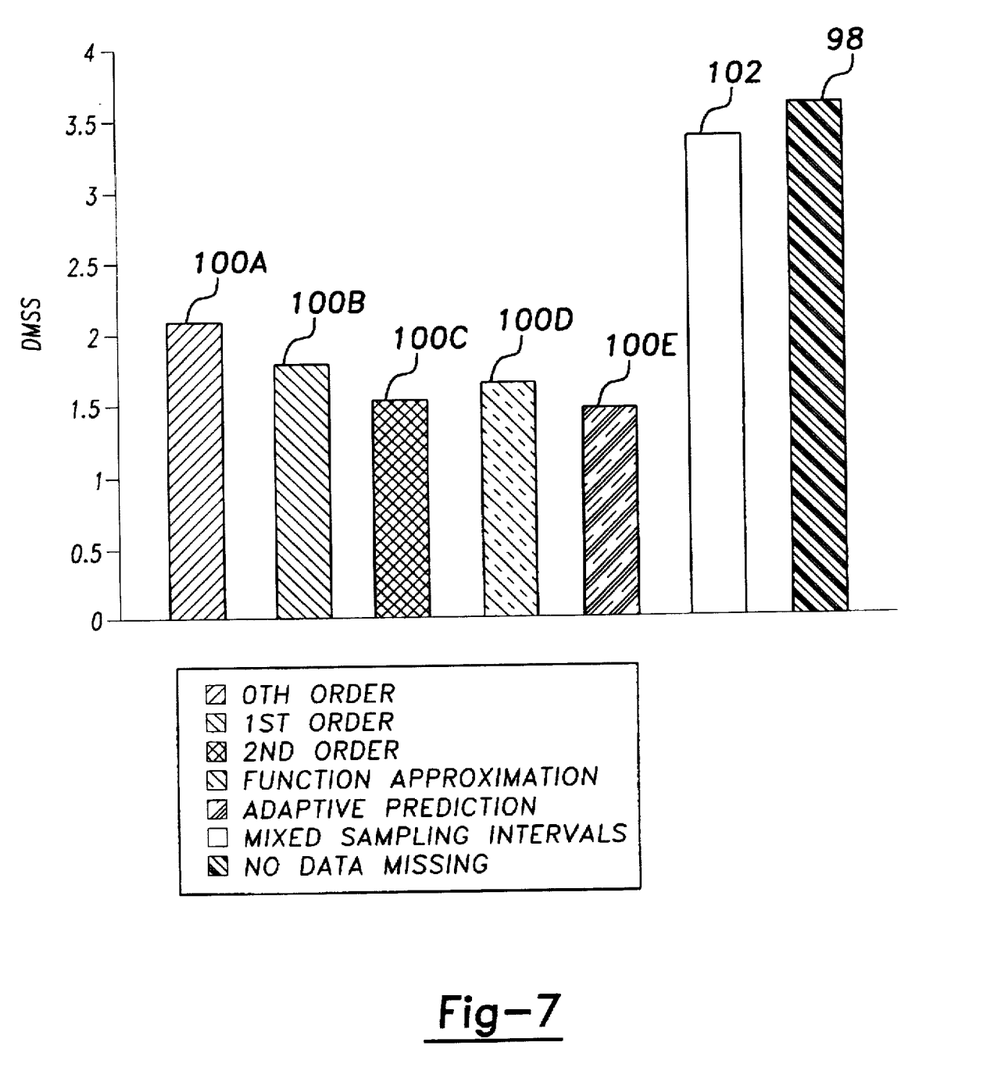
FIG. 7 graphically illustrates a performance comparison of a control method which has no data points missing, the present invention, and five prior art methods.

Comparison in separation performance of misfire and normal firing for a given case of a speed of 6000 RPM and a MAP of 200 torr is illustrated in FIG. 7. DMSS labeled at the y-axis in FIG. 7 is a measure commonly utilized in the industry to rate separation performance of two signatures, where DMSS stands for the ratio of the Difference of Means and Summation of Standard Deviations of two signal components. As shown in FIG. 7, the present invention greatly enhances the ability to supply missing data points. The bar 98 represents the separation permanence of the signal generated from a crankshaft sensor wheel having evenly distributed 10° teeth about its entire circumference. Thus, no data points were missing. The bars 100A–100E represent the performance of five prior art methods for interpolating or predicting missing data points. The bar 102 represents the current invention's capability of estimating missing data points. As can be seen, the present invention approximately doubles the performance rating of prior art methods.

It should be appreciated that while methodology for estimating four missing data points is disclosed in accordance with the preferred embodiment of the present invention, minor programming changes may be made to the methodology of the present invention to extend the methodology for estimating more or less missing data points and for other crankshaft sensor wheels with different tooth sizes or separations. Also, a sensor compatible with the uneven spacing between teeth would enable the present invention to be implemented by estimating three missing data points for the 10° crankshaft sensor wheel of FIG. 2.

From the foregoing description, it should be appreciated that the engine misfire detection system of the present invention, through a mixed rate sampling of crankshaft angular velocity provides a highly accurate way of detecting engine misfire occurrences. The mixed rate sampling of crankshaft angular velocity performs much better than conventional interpolation or prediction methods and is easier to implement. In addition, the engine misfire detection methodology of the present invention is capable of determining misfire occurrences, without the need for implementation of complex function approximation or adaptive prediction methods. Thus, the engine misfire detection system of the present invention facilitates auto manufacturer compliance with government regulations, such as those mandated by CARB, with minimal subsequent reconfiguring of the engine control system.

While the above detailed description describes the preferred embodiment of the present invention, the invention is susceptible to modification, variation and alteration without deviating from the scope and fair meaning of the subjoined claims.

What is claimed is:

1. An apparatus for determining a misfire occurrence in an internal combustion engine comprising:
  a crankshaft in operative relation with said internal combustion engine;
  a crankshaft sensor wheel rotatably driven by said crankshaft, said wheel having thereon a plurality of engine speed indicators and at least one timing synchronization indicator;
  sensor means positioned adjacent to said wheel for sensing the passage of each said indicator and producing in response thereto a signal pulse having a duration corresponding to an angular width of said sensed indicator;
  time determining means for determining time intervals of said signal pulses generated by said sensor means;
  recognition means for recognizing a synchronization signal time interval and an rpm signal time interval;
  conversion means for converting said synchronization signal time interval into a plurality of estimated rpm values by dividing the number of rpm signal time intervals replaced by said synchronization signal time interval by a duration of said synchronization signal time interval; and
  misfire detection means for detecting a misfire occurrence based on said rpm signal time intervals and said estimated rpm values.

2. The apparatus of claim 1 wherein said synchronization time interval includes a duration of a synchronization indicator generated pulse and at least one adjacent engine speed indicator generated pulse.

3. The apparatus of claim 1 wherein said plurality of engine speed sensor indicators further comprise:
  a plurality of first size teeth disposed about a perimeter of said crankshaft sensor wheel.

4. The apparatus of claim 3 wherein said synchronization sensor indicators further comprise:
  at least one second size tooth disposed among said first size teeth; and
  at least one second size slot disposed among said first size teeth.

5. The apparatus of claim 3 wherein said at least one second size tooth is located at a position on the crankshaft sensor wheel corresponding to top dead center for at least one piston expansion stroke.

6. The apparatus of claim 3 wherein said at least one second size slot is located at a position on the crankshaft sensor wheel corresponding to top dead center for at least one piston expansion stroke.

7. The apparatus of claim 1 wherein said sensor means further comprises a magnetic sensor.

8. The apparatus of claim 7 wherein said magnetic sensor is a hall effect sensor.

9. The apparatus of claim 1 wherein said time determining means further comprises a counter.

10. The apparatus of claim 1 wherein said recognition means further comprises a micro-computer.

11. The apparatus of claim 4 wherein an angular width of each of said first size teeth approximately equals 10°, an angular width of said second size tooth approximately equals 30°, and an angular width of said second size slot approximately equals 30°.

12. An apparatus for determining a misfire occurrence of an internal combustion engine comprising:
  a crankshaft;
  a crankshaft sensor wheel coupled to said crankshaft, said crankshaft sensor wheel having a plurality of engine speed indicators of a first size and cylinder firing synchronization indicators of a second size formed about a periphery thereof;
  sensor means for sensing rotation of said crankshaft sensor wheel and providing a crankshaft sensor wheel signal having periodic pulses having a duration corresponding to said first and second sizes; and
  signal processing means responsive to said crankshaft sensor wheel signal for converting a cylinder firing synchronization portion of said signal into a plurality of estimated engine speed values by dividing a number of engine speed portions of said signal replaced by said cylinder firing synchronization portion by a duration of said cylinder firing synchronization portion, said cylinder firing synchronization portion including a cylinder firing synchronization pulse and at least one adjacent engine speed pulse and determining said misfire occurrence based on said engine speed pulses and said estimated engine speed values.

13. The apparatus of claim 12 further comprising:
  recognizing means for recognizing said cylinder firing synchronization portion.

14. The apparatus of claim 12 wherein said first size is approximately equal to an angular width of 10° and said second size is approximately equal to an angular width of 30°.

15. The apparatus of claim 12 wherein said periodic pulses include a cylinder firing synchronization signature pulse and an engine speed signature pulse.

16. The apparatus of claim 12 wherein said signal processing means converts said engine speed pulse durations and said estimated engine speed values into a series of data points representative of normal firing occurrences and misfire occurrences.

17. The apparatus of claim 12 wherein said signal processing means calculates a crankshaft angular velocity based on said engine speed pulse durations and said estimated engine speed values.

18. The apparatus of claim 12 wherein said signal processing means processes said crankshaft angular velocity signals to enhance a ratio of signal-to-noise using digital signal processing techniques.

19. An internal combustion engine misfire detecting apparatus comprising:

a crankshaft sensor wheel rotated by a crankshaft, the crankshaft sensor wheel having indicators of preselected sizes spaced at predetermined angles around its periphery and means for sensing the passing of the indicators on the crankshaft sensor wheel as the crankshaft is rotated and providing a crankshaft sensor wheel angle signal including a signature for each engine speed indicator and cylinder firing synchronization indicator sensed, each signature representing a rotation of the crankshaft equal to the preselected size of the sensed indicator;

timing means for measuring a duration of a cylinder firing synchronization portion of said signal;

estimating means for estimating a plurality of rpm values by dividing a number of engine speed portions of said signal replaced by said cylinder firing synchronization portion by a duration of said cylinder firing synchronization portion; and misfire detecting means for determining a misfire occurrence based on said engine speed signals and said plurality of rpm values.

20. The apparatus of claim 19 wherein said cylinder firing synchronization portion of said crankshaft sensor wheel angle signal further comprises said cylinder firing synchronization indicator signature and at least one adjacent engine speed indicator signature.

* * * * *